Jan. 1, 1963     D. E. HILL     3,071,715
POWER RECTIFIER
Filed Aug. 15, 1960
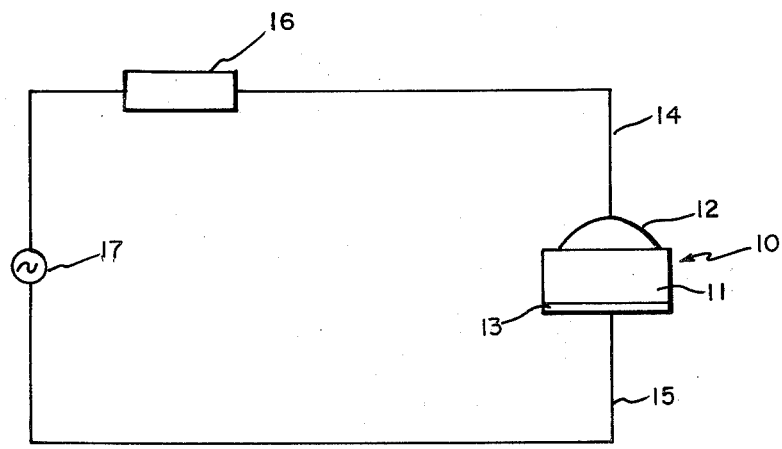
*INVENTOR.*
DALE E. HILL
BY *Lloyd B. Stevens, Jr.*
ATTORNEY

United States Patent Office 3,071,715
Patented Jan. 1, 1963

3,071,715
POWER RECTIFIER
Dale E. Hill, Dayton, Ohio, assignor to Monsanto Chemical Company, St. Louis, Mo., a corporation of Delaware
Filed Aug. 15, 1960, Ser. No. 51,664
11 Claims. (Cl. 317—237)

The invention relates to a power rectifier usable at high temperatures having a cubic boron phosphide semiconductor body or element as a part thereof. This application is a continuation-in-part of copending application Serial No. 846,851, filed October 16, 1959, and now abandoned.

It is a primary object of this invention to provide a power rectifier that will operate at high temperatures, i.e. temperatures up to about 1,000° C.

This and other objects of the invention will become apparent as the detailed description of the invention proceeds.

Crystalline boron phosphide has been found to be especially suitable for high temperature use. It has been found by optical measurements on cubic crystalline boron phosphide that it has a forbidden energy gap of about 5.8 electron volts. This compares with silicon having a forbidden energy gap of about 1 electron volt and germanium having a forbidden energy gap of about 0.7 electron volt. Germanium can only be used as a rectifier at temperatures up to about 80° C. Silicon can be used at higher temperatures than germanium; but cannot be used at temperatures even approaching that at which boron phosphide can be used, i.e. up to about 1,000° C. Crystalline boron phosphide exhibits the usual negative temperature coefficient of resistance of a semiconductor. Doping agents from either groups II-B or VI-B of Mendeleeff's Periodic Table and magnesium and beryllium can be used to change the type or degree of conductivity of crystalline boron phosphide. For use in power rectifiers crystalline boron phosphide is normally doped to give a carrier concentration in the range of about $10^{12}$ to about $10^{18}$ per cubic centimeter, preferably about $10^{14}$ to about $10^{17}$, but in any event the doping should be less than an amount to give boron phosphide crystals capable of forming P-N junctions with substantial negative resistance characteristics.

A number of different processes for producing crystalline cubic boron phosphide are known as illustrated by copending applications which are described hereinbelow.

Copending application S.N. 718,463, filed March 3, 1958, now Patent No. 2,966,426, describes a process for producing crystalline boron phosphide which involves contacting a boron halide, hydride or alkyl with a phosphorus halide or hydride at a temperature of at least 1,100° F. If it is desired, during the process of producing the boron phosphide, a volatile chloride of a group II-B element or magnesium or beryllium can be added to the reactants in minor amounts to give a P-type boron phosphide crystalline material. If an N-type material is desired a group VI-B element can be added during the process in trace amounts to give an N-type crystalline boron phosphide. Actually, during the process of making the crystalline boron phosphide whether doping agents are added or not, sufficient impurities will normally be picked up by the boron phosphide being formed to make it either N- or P-type. Doping of the boron phosphide, of course, can be done after the formation of the crystalline boron phosphide by diffusion of the doping agents into the crystalline structure at elevated temperatures, but normally it is preferred to do the doping during the manufacture of the boron phosphide.

Another copending application S.N. 718,464, filed March 3, 1958, now Patent No. 2,974,064, describes a process of producing crystalline boron phosphide by contacting a gaseous boron compound with elemental phosphorus and hydrogen at a temperature of at least 1,100° F. Doping during the manufacture of the boron phosphide is conducted, if desired, in a manner similar to that described for the process of application S.N. 718,463 hereinabove.

In application S.N. 718,465, filed March 3, 1958, describes a process of producing crystalline boron phosphide by heating a metal phosphide and a metal boride in an inorganic matrix. In this process doping to form N-type material can be accomplished by adding oxygen or sulfur preferably an oxide or a sulfide in small amounts to the inorganic matrix. Actually, the preferred element in all the processes for doping to obtain N-type conductivity are selenium and tellurium, and in this process selenium and tellurium could be added directly to the melt. Polonium of course, normally will be a less desirable and much more expensive doping agent, but if it were desirable to use this element it too, could be added as an element to the melt from which the boron phosphide crystals are produced. To obtain P-type boron phosphide crystals by doping, beryllium, magnesium, zinc, cadmium or mercury metals can be added to the melt of this process, preferably beryllium, magnesium, zinc or cadmium.

Copending application S.N. 823,329, filed June 29, 1959, describes a process for producing cubic crystalline boron phosphide of N-type conductivity involving contacting a gaseous stream of boron suboxide with a gaseous stream of elemental phosphorus at a temperature in the range of about 1,000° C. to 1,800° C. and precipitating boron phosphide from the gas phase. Doping to change the degree or type of conductivity, if desired, is carried out in this method in a manner similar to that described for application S.N. 718,463 hereinabove.

Application S.N. 823,360, filed June 29, 1959, describes a process of producing single crystals of boron phosphide. In this process a crude source of boron phosphide is contacted with a hydrogen halide vapor at a temperature in the range of from 600 to 1,500° C. and the resulting gaseous mixture is subjected to a higher temperature in the range of from 800 to 1,800° C. using a temperature increase from the first zone of contacting to the second zone of contacting of from 50° C. to 1,000° C. with the resultant production of a single crystal of boron phosphide in the second zone. Doping, if desired, to vary the degree or type of conductivity can be carried out in a manner similar to that described hereinabove for application S.N. 718,463.

Doping boron phosphide after the formation of the boron phosphide crystal, a method not normally quite so desirable as doping during the manufacture of the crystal, can be carried out as follows: The boron phosphide is heated up to a temperature of about 800° C. and subjected to a trace amount of the vaporized doping element which is allowed to diffuse into the boron phosphide crystal. Normally long periods of time will be required for this type of doping procedure, possibly several days or more. When it is decided that sufficient doping agent has diffused throughout the crystal of boron phosphide, the crystal is rapidly quenched reducing the temperature down to room temperature. This, of course, is the conventional diffusion and quench method used for doping semiconductor materials after the crystalline material has been made. If the material is cooled slowly, rather than being quenched, the doping agent will diffuse right out of the crystal lattice again. Quenching traps the doping agent with the crystal lattice.

Broadly speaking the power rectifier of the invention usable at high temperatures comprises a boron phosphide semiconductor body, a high melting point conductor attached to the semiconductor body forming an ohmic junction thereon, and a P-N junction as a part of the rectifier.

The invention will be more clearly understood from the following detailed description of a specific example thereof, read in conjunction with the accompanying drawing wherein:

The accompanying FIGURE is a schematic drawing of an embodiment of the invention with accompanying circuitry.

In the FIGURE is shown rectifier 10 designed for high temperature operation with accompanying circuitry. A single crystal of cubic boron phosphide having N-type conductivity constitutes semiconductor body 11 of the rectifier. Suitably semiconductor body 11 is in the form of a thin disc or wafer of boron phosphide. To form the rectifying contact on the semiconductor body, nickel conductor 12, having 10% by weight based on nickel, of cadmium incorporated therein is fused to one side of disc 11. This fusion is accomplished by pressing conductor 12 suitably in the form of a bead against one side of disc 11 at an elevated temperature of about 1100° C. and allowing sufficient time for cadmium in the nickel conductor to fuse into the surface of disc 11; thereby conductor 12 is fused, soldered or welded to disc 11.

An ohmic junction is made to the other side of disc 11 by fusing a nickel electrode 13 having 10% by weight based on nickel of tellurium therein to the bottom portion of disc 11 in a similar manner to that described for fusing conductor 12 to the other side of disc 11. If rectifier 10 is not to be encapsulated and would be subjected to an oxidizing atmosphere at high temperatures, it is preferred to use nickel or tungsten or molybdenum leads 14 and 15, which are soldered or welded to conductors 12 and 13, respectively. If rectifier 10 is to be encapsulated or is not to be subjected to an oxidizing atmosphere at high temperature copper leads rather than nickel or tungsten or molybdenum can be used. Alternating current source 17 is applied to rectifier 10 through resistor 16 and the rectified voltage appears across resistor 16. At least at temperatures above about 800° C., it is preferred to encapsulate the rectifier.

Another method of making ohmic contact with wafer 11 is to fuse a platinum contact to the lower surface of wafer 11. It should be noted however, that this alternative method of making ohmic contact with the boron phosphide wafer is not as desirable as the first method described, wherein nickel-containing tellurium is fused to the wafer. In fusing the platinum contact to the wafer a sufficiently high temperature, preferably not more than about 800° C. is used.

Ohmic contact can also be made to N or P-type boron phosphide by the use of tungsten coated with tellurium or cadmium respectively. Molybdenum can be substituted for tungsten for this purpose.

Instead of forming the N-P junction between conductor 12 and wafer 11, wafer 11 can be manufactured having an internal N-P junction. Starting with N-type boron phosphide, a rectifying junction can be made by diffusing a group II-B metal, e.g. cadmium, or magnesium or beryllium into one side of the wafer, producing a P-type surface. On the other hand, starting with P-type boron phosphide, a rectifying junction can be made by diffusing a group VI-B element into one side of the wafer.

Another method for making a rectifying junction is to add the proper doping material, or to charge the type of doping material (from group II-B to group VI-B magnesium and beryllium elements) during the growth of the crystals.

Still another method of producing rectifying junctions is the heating of an N-type boron phosphide wafer to high temperature (about 1200° C.) in vacuum. In this case phosphorus is lost by out-diffusion which results in a P-type boron-rich layer on the surface.

With junctions formed by any of the above methods, contact can be made to the N or P-type side using nickel alloyed with tellurium or cadmium, respectively, in amounts mentioned previously.

It is indicated hereinabove that nickel having 10% by weight based on nickel of cadmium or tellurium is useful for making ohmic or rectifying contacts to boron phosphide, and zinc or selenium, respectively could be used to replace the cadmium or tellurium. Actually, mercury, beryllium or magnesium can be used instead of zinc or cadmium, and oxygen, sulfur or polonium can be used instead of selenium or tellurium; however, magnesium, beryllium, cadmium or zinc or mixtures thereof and selenium or tellurium or mixtures thereof are the preferred elements to use. Normally, it will be desirable to use not more than about 20%, preferably not more than about 15%, by weight of the groups II-B and VI-B elements, magnesium and beryllium in the nickel based on the nickel; however, larger amounts can be used but in any event the mixture of nickel and these elements should consist primarily of nickel on a weight basis, i.e. nickel having minor amounts of these elements therein. Other conductors than nickel having high melting points can be used in place of conductors 12 and 13, e.g. iron, silver, gold, copper, etc. The group II-B magnesium and beryllium or group VI-B doping agents would be incorporated in these other metals in the same proportion as they were in nickel for the device of the figure. These other conducting metals would then replace nickel conductors 12 and 13 of the figure.

Although the invention has been described in terms of specified apparatus which is set forth in considerable detail, it should be understood that this is by way of illustration only and that invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A high temperature power rectifier comprising a semi-conductor body of cubic boron phosphide doped to a carrier concentration of less than the amount necessary to give a body capable of forming P-N junctions with substantial negative resistance characteristics, a first high melting point conductor attached to said semiconductor body forming an ohmic junction thereon, and a second high melting point conductor attached to the surface of said semiconductor body forming a P-N junction therewith.

2. The rectifier of claim 1, wherein said first conductor has a minor amount of an element selected from groups II-B and VI-B of Mendeleeff's Periodic Table, magnesium and beryllium, said conductor being fused to said first semiconductor body.

3. The rectifier of claim 2, wherein said second high melting point conductor having a minor amount of an element selected from groups II-B and VI-B of Mendeleeff's Periodic Table, magnesium and beryllium of the opposite conductivity type than said semiconductor body is fused thereto forming said P-N junction.

4. The rectifier of claim 3, wherein said semiconductor body is N-type, said first conductor is nickel and said element therein is selected from the class consisting of selenium and tellurium, and said second conductor is nickel and said element therein is selected from the class consisting of magnesium, beryllium, cadmium and zinc.

5. The rectifier of claim 3, wherein said semiconductor body is P-type, said first conductor is nickel and said element therein is selected from the class consisting of magnesium, beryllium, cadmium and zinc, and said second conductor is nickel and said element therein is selected from the class consisting of selenium and tellurium.

6. A high temperature power rectifier comprising an N-type cubic boron phosphide semiconductor wafer doped to a carrier concentration of less than the amount necessary to give a wafer capable of forming P-N junctions with substantial negative resistance characteristics, a nickel conductor having therein not more than about 15% by weight based on nickel of an element selected from the class consisting of selenium and tellurium fused to one side of said wafer forming an ohmic junction therewith, and a nickel conductor having therein not more than about 15% by weight based on nickel of an element selected from the class consisting of cadmium and zinc fused to the other side of said wafer forming a P-N junction.

7. The rectifier of claim 6, wherein nickel electrical leads are attached to said nickel conductor.

8. The rectifier of claim 6, wherein copper electrical leads are attached to said nickel conductor.

9. A high temperature power rectifier comprising a P-type cubic boron phosphide semiconductor wafer doped to a carrier concentration of less than the amount necessary to give a wafer capable of forming P-N junctions with substantial negative resistance characteristics, a nickel conductor having therein not more than about 15% by weight based on nickel of an element selected from the class consisting of cadmium and zinc fused to one side of said wafer forming an ohmic junction therewith, and a second nickel conductor having therein not more than about 15% by weight based on nickel of an element selected from the class consisting of selenium and tellurium fused to the other side of said wafer forming a P-N junction.

10. The rectifier of claim 9, wherein nickel leads are attached to said nickel conductor.

11. The rectifier of claim 9, wherein copper leads are attached to said nickel conductors.

References Cited in the file of this patent

FOREIGN PATENTS 719,873     Great Britain _____ Dec. 8, 1954